May 20, 1958 M. G. MAIXNER 2,835,543
SERVICE TRAY FOR AUTOMOBILES OR THE LIKE
Filed Aug. 19, 1957 2 Sheets-Sheet 1

INVENTOR
MARION G. MAIXNER

BY Cushman, Darby & Cushman
ATTORNEYS

May 20, 1958 M. G. MAIXNER 2,835,543
SERVICE TRAY FOR AUTOMOBILES OR THE LIKE
Filed Aug. 19, 1957 2 Sheets-Sheet 2
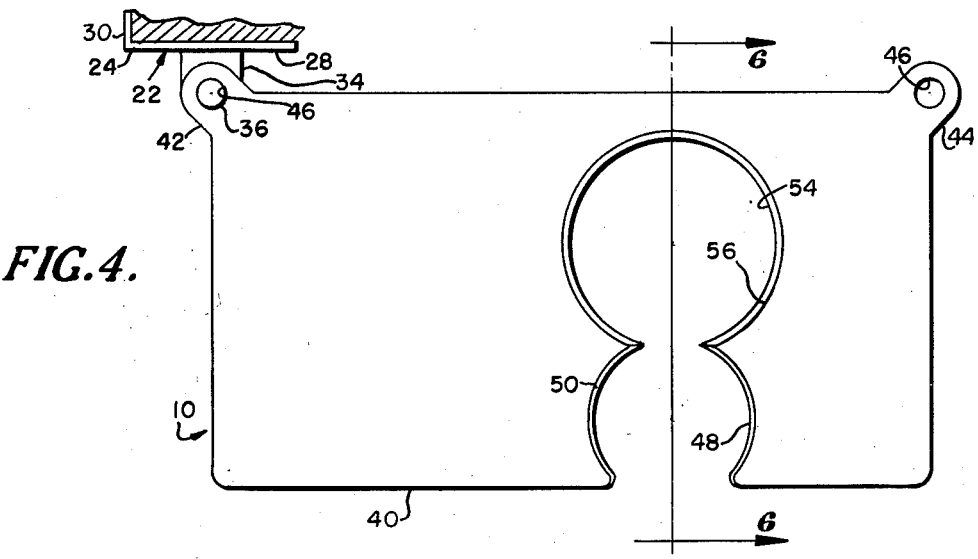
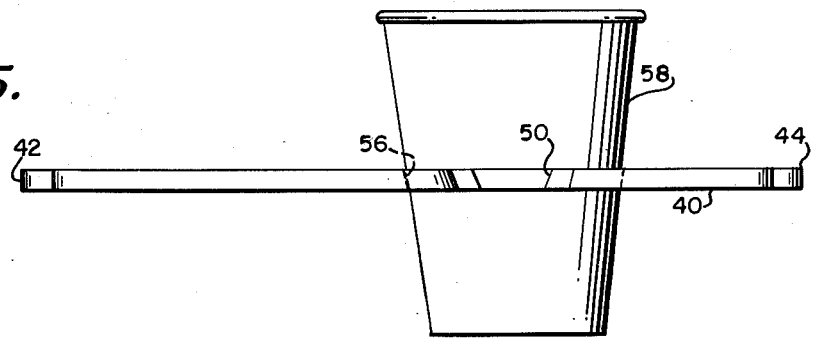
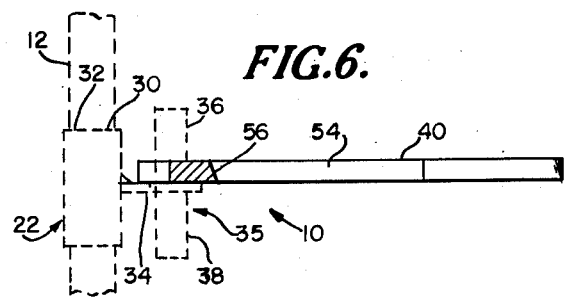
INVENTOR
MARION G. MAIXNER
BY *Cushman, Darby & Cushman*
ATTORNEYS United States Patent Office 2,835,543
Patented May 20, 1958

2,835,543
SERVICE TRAY FOR AUTOMOBILES OR THE LIKE

Marion G. Maixner, Harlowton, Mont.

Application August 19, 1957, Serial No. 678,959

7 Claims. (Cl. 311—21)

The present invention relates to a service tray for vehicles and, more particularly, to a service tray adapted to be detachably and pivotally mounted on an automobile or the like.

An object of the present invention is to provide a tray device which may be detachably mounted on a support in a vehicle, the device when mounted being capable of pivoting from one position to another, so that it may be stored when not in use.

Another object of the present invention is to provide a tray device detachably mounted on a mullion post of an automobile, the pivoted window of the mullion post being adapted to be closed when the tray device is in mounted position.

Still another object of the present invention is to provide a tray device which may be mounted on a mullion post of an automobile or the like, the pivoted window of the mullion post being utilized to assist in supporting the device when the window is in the closed position.

A further object of the present invention is to provide a tray device which may be selectively and detachably mounted on either side of a vehicle and which, when mounted, may be pivoted from one position to another position.

Still another object of the present invention is to provide a tray device having means for carrying liquid-filled receptacles of different sizes in an upright position, the receptacles being so held that they cannot overturn.

These and other objects of the present invention will be described more fully in the following specification, claims and drawings, in which:

Figure 1 discloses a fragmentary perspective view of a vehicle having a service tray of the present invention mounted therein on a ventilating window mullion post.

Figure 4 is a plan view, partly in section, of the tray of the present invention.

Figure 5 is an elevational view of the tray device of the present invention, showing the same supporting a receptacle.

Figure 6 is a sectional view, taken on the line 6—6 of Figure 4.

Figure 1:
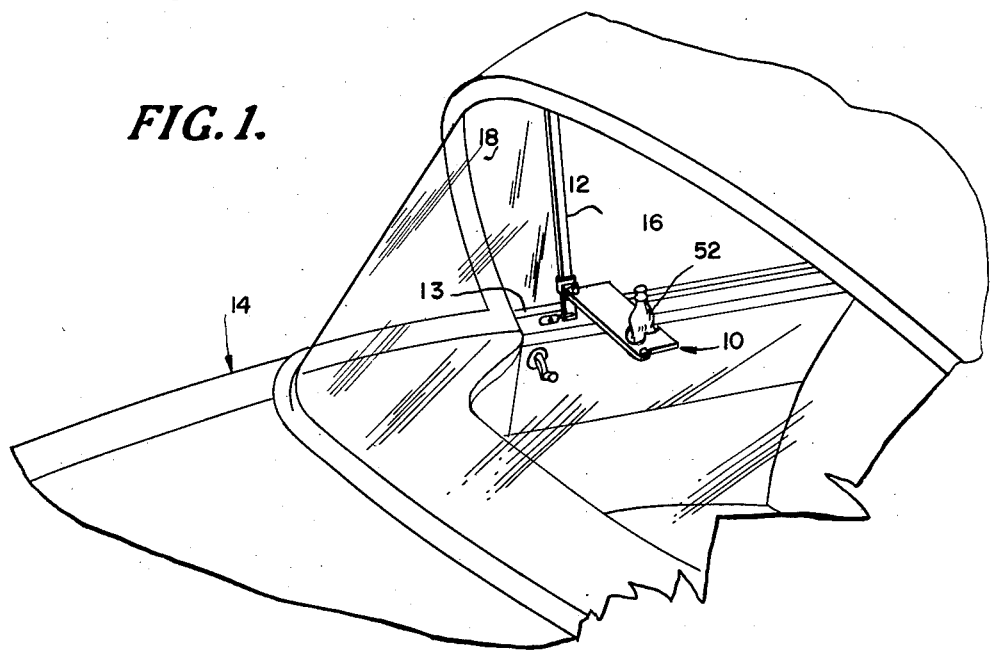
Figure 2:
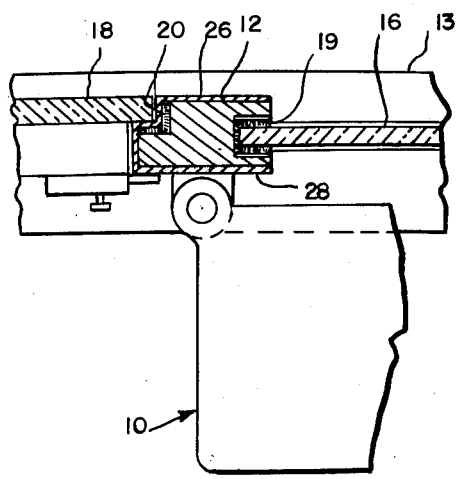
Figure 2 is a fragmentary horizontal sectional view, through a mullion post of a vehicle, showing the tray device of the present invention mounted thereon.

Referring now to the drawings, wherein like characters or reference numerals represent like or similar parts, the tray device of the present invention, which is generally designated by the numeral 10, is shown in Figure 1, mounted on a vertical mullion post 12 of a door 13 of a vehicle, such as an automobile 14. The vertical mullion post 12 is usually provided between a side window 16 and a no-draft window 18 of the door 13 of automobile 14. In more detail, the side window 16 is of the usual type which is raised and lowered to close and open the same, whereas the no-draft ventilating window 18 is of the usual type which is pivoted to the door frame on a substantially vertical axis. As shown in Figure 2, the mullion post 12 is provided with a groove 19 along one edge for receiving the window 16 and a recess 20 in one corner thereof for receiving the ventilating window 18, so that it may be flush with the mullion post when it is closed.

Figure 3:
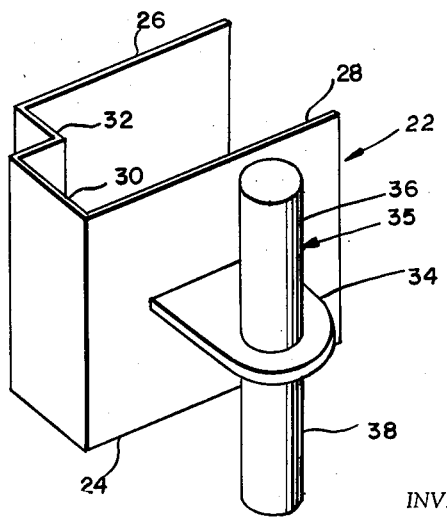
Figure 3 is an enlarged perspective view of the mounting bracket for the tray device of the present invention.

Referring now to Figure 3, the tray device 10 is provided with a bracket 22 which is adapted to be detachably supported on the mullion post 12. Bracket 22 includes a substantially U-shaped clamp 24, the clamp being provided with the legs 26 and 28 which are separated by a web 30. The leg 26 of clamp 24 is bent complementary to the mullion post 12 so that it is provided with a portion 32 which fits flush in the recess 20 of the mullion post. As shown in Figure 2, when the clamp 24 of bracket 22 is positioned on the mullion post 12, the bent portion 32 of leg 26 fits in the recess 20 of the mullion post so that the pivoted ventilating window 14 may be closed and substantially flush with the mullion post. By having the offset portion 32 on the leg 26 of clamp 24, the window 18 assists in retaining the bracket 22 in position on the mullion post when the window is in the closed position. However, it is also evident that the legs 26 and 28, which are made of spring steel, or the like, will clamp the bracket in position even though the window 14 is open.

The leg 28 of the U-shaped clamp 24, which is adapted to fit flush against the inside surface of mullion post 12, is provided with a substantially flat lug element 34 that extends outwardly therefrom. The lug element 34 lies in a substantially horizontal plane when the bracket member 22 is positioned on the mullion post 12. A post member, generally designated by the numeral 35, extends normally to the lug element 34 and is integrally secured thereto. In effect, the post member 35 provides a pair of axially aligned pivot posts 36 and 38. The purpose of providing posts extending both above and below the lug element 34 will be more apparent later in the specification.

A substantially rectangular tray 40 is provided with ear-like projections 42 and 44 on two of its corners. Each ear-like projection 42 or 44 of the tray 40 is provided with a hole 46 of substantially the same diameter as the diameter of the posts 36 and 38. As is now evident, when the bracket member 22 is positioned on the mullion post 12, one of the posts 36 or 38 will extend vertically upwardly from the lug element 34 and one of the holes 46 may be selectively used to receive the upwardly extending post, whereby the tray 40 is detachably supported for pivotal movement. By providing ear-like projections 42 and 44 on two corners of the tray, the tray may be mounted on either corner to pivot in any desired manner with respect to the mullion post 12 on which the bracket 22 is mounted. On the other hand, by providing posts 36 and 38 integrally extending from opposite sides of the lug element 34, the bracket 22 may be utilized on any of the mullion posts of the automobile 14. In other words, if the mullion post adjacent the driver is used, the bracket 22, as shown in Figure 3, is merely turned upside down so that the post 38 will be on the top and the post 36 on the bottom. Such an arrangement permits the same bracket to be used on either side of the automobile in exactly the same manner.

Referring now to Figures 4, 5 and 6, the tray 40 is provided with a first receptacle-receiving aperture 48, which extends from and is open to one edge of the tray. The wall of the aperture 48 is tapered inwardly, as shown at 50, in Figures 4 and 5, and the aperture is of such diameter that it will receive and support a soft drink bottle of hourglass shape, such as the bottle 52, shown in Figure 1. A second aperture 54 provided in tray 40 is of larger diameter than the aperture 48 and overlaps the aperture 48 so that there is open communication between the two apertures. The aperture 54 is tapered inwardly, as indicated at 56, and is adapted to receive receptacles 58, such as paper cups or the like.

From the above description, it is now evident that the tray device of the present invention fulfills its objects. The device may be easily and inexpensively manufactured, the bracket 22 being preferably made of metal and the tray 40 being molded from a plastic material or constructed from any light sheet metal material, such as aluminum or the like.

The terminology used in this specification is for the purpose of description and not limitation, the scope of the invention being defined in the claims.

I claim:

1. In a service tray combination for mounting on a mullion post of a pivoted ventilating window of an automobile: a bracket, said bracket including a substantially U-shaped clamp detachably secured to the mullion post and held in position by the pivoted ventilating window, a substantially flat lug extending outwardly of one leg of said clamp, a pair of posts, said posts extending from opposite sides of said lug in axial alignment with each other and being arranged on said lug so that one of said posts extends vertically upwardly when said clamp is secured to the mullion post; and a substantially rectangular tray, said tray having a hole therethrough adjacent one of its corners for receiving the post extending vertically upwardly from said lug, whereby said tray is detachably and pivotally supported on said bracket.

2. A tray combination of the character described in claim 1, wherein said tray is provided with a first receptacle-receiving aperture extending from and opening to one edge thereof and a second receptacle-receiving aperture having a larger diameter than said first receptacle-receiving aperture and open to said first receptacle-receiving aperture.

3. A service tray combination of the character described in claim 1, wherein said tray is provided with a second hole therethrough adjacent another of its corners, said first and second holes selectively receiving the post extending vertically upwardly.

4. In a service tray combination for mounting on a mullion post of a pivoted ventilating window of an automobile, the mullion post having a recess to receive the pivoted ventilating window: a bracket, said bracket including a substantially U-shaped clamp having one of its legs bent complementary to the recess in the mullion post so that when said clamp is positioned on the mullion post, the ventilating window is capable of being pivoted substantially shut and flush therewith, a substantially flat lug extending outwardly of the other leg of said clamp, a post extending vertically upwardly from said lug; and a substantially rectangular tray, said tray having a hole therethrough adjacent one of its corners for receiving the post of said bracket whereby said tray is detachably and pivotally supported on said bracket.

5. In a service tray combination for mounting on a mullion post of a pivoted ventilating window of an automobile, the mullion post having a recess to receive the pivoted ventilating window: a bracket, said bracket including a substantially U-shaped clamp having one of its legs bent complementary to the recess in the mullion post so that when said clamp is positioned on the mullion post, the ventilating window is capable of being pivoted substantially shut and flush therewith, a substantially flat lug extending outwardly of the other leg of said clamp, a post extending vertically upwardly from said lug; and a substantially rectangular tray, said tray having a projection extending from at least one of its corners, said projection having a hole therethrough for receiving the post of said bracket, whereby said tray is detachably and pivotally supported on said bracket.

6. A service tray combination of the character described in claim 5, wherein said tray is provided with a first receptacle-receiving aperture extending from and opening to one edge thereof and a second receptacle-receiving aperture having a larger diameter than said first receptacle-receiving aperture and open to said first receptacle-receiving aperture.

7. In a service tray combination for mounting on a mullion post of a pivoted ventilating window of an automobile: a bracket, said bracket having a substantially U-shaped clamp detachably secured to the mullion post, a substantially flat lug element extending outwardly of one leg of said clamp, a substantially rectangular tray element, one of said elements having a post mounted vertically thereon and the other of said elements having a hole therethrough for receiving said post, whereby said tray element is detachably and pivotally supported on said lug element.

References Cited in the file of this patent

UNITED STATES PATENTS

| | | |
|---|---|---|
| 1,870,109 | Goforth | Aug. 2, 1932 |
| 2,526,322 | Black | Oct. 17, 1950 |
| 2,549,753 | Ashman | Apr. 24, 1951 |
| 2,593,222 | Tracy | Apr. 15, 1952 |